US011388172B2

(12) United States Patent
Rahman et al.

(10) Patent No.: US 11,388,172 B2
(45) Date of Patent: Jul. 12, 2022

(54) CLEARED USER FACILITATION AND CONTROL SYSTEM

(71) Applicant: Microsoft Technology Licensing, LLC, Redmond, WA (US)

(72) Inventors: Soumit Rahman, Redmond, WA (US); Ganesh Pandey, Redmond, WA (US); Curtis Thibault, Redmond, WA (US); Kameshwar Jayaraman, Redmond, WA (US); Ajay Kalidindi, Redmond, WA (US); Ayla Kol, Sammamish, WA (US); Yeshua Garcia, Redmond, WA (US); Priyanshu Kumar Jha, Kirkland, WA (US); Parul Manek, Redmond, WA (US); Yoganand Rajasekaran, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 385 days.

(21) Appl. No.: 16/534,546

(22) Filed: Aug. 7, 2019

(65) Prior Publication Data

US 2021/0044597 A1 Feb. 11, 2021

(51) Int. Cl.
*H04L 29/06* (2006.01)
*H04L 9/40* (2022.01)

(52) U.S. Cl.
CPC .......... *H04L 63/105* (2013.01); *H04L 63/102* (2013.01)

(58) Field of Classification Search
CPC .......................... H04L 63/105; H04L 63/102
See application file for complete search history.

(56) References Cited

U.S. PATENT DOCUMENTS

| | | | | |
|---|---|---|---|---|
| 2005/0102153 A1* | 5/2005 | Arik | ....................... | G06Q 10/10 705/26.25 |
| 2007/0294258 A1* | 12/2007 | Caldwell | ................. | G06Q 10/10 |
| 2008/0178300 A1* | 7/2008 | Brown | ................ | H04L 63/0428 726/29 |
| 2009/0180607 A1* | 7/2009 | Kamlet | ............... | H04M 3/5233 379/265.12 |
| 2009/0204470 A1* | 8/2009 | Weyl | ...................... | G06Q 10/06 705/7.13 |

(Continued)

FOREIGN PATENT DOCUMENTS

CN          102332115 A          1/2012

OTHER PUBLICATIONS

"International Search Report and Written Opinion Issued in PCT Application No. PCT/US20/037342", dated Sep. 16, 2020, 11 Pages.

(Continued)

*Primary Examiner* — Shin-Hon (Eric) Chen
(74) *Attorney, Agent, or Firm* — Christopher J. Volkman; Kelly, Holt & Christenson, PLLC

(57) ABSTRACT

A request to perform a command or operation on a computing system is received from a support user. A clearance level needed to perform that requested command or operation is identified, and a data store that has a pool of cleared users is accessed to identify a cleared user that has an adequate clearance level. The secured user is assigned to the request. A risk level, corresponding to the requested command or operation is identified and surfaced for the secured user. The requested command or operation can be automatically executed, after it is authorized by the secured user.

17 Claims, 7 Drawing Sheets

(56) References Cited

U.S. PATENT DOCUMENTS

| | | | | |
|---|---|---|---|---|
| 2009/0204471 | A1 | 8/2009 | Elenbaas et al. | |
| 2010/0176916 | A1* | 7/2010 | Baucom | G07C 9/27 340/5.5 |
| 2015/0106873 | A1* | 4/2015 | Marsh | G06Q 10/0635 726/1 |
| 2016/0335414 | A1* | 11/2016 | Isaacs | G16H 40/67 |
| 2017/0228558 | A1* | 8/2017 | Le Rudulier | G06F 21/57 |
| 2018/0300198 | A1* | 10/2018 | Symington | G06F 11/0751 |
| 2019/0147182 | A1* | 5/2019 | Arora | G06F 16/00 726/28 |
| 2019/0171845 | A1* | 6/2019 | Dotan-Cohen | H04L 63/102 |
| 2020/0160242 | A1* | 5/2020 | Johnson | G06Q 10/0633 |

OTHER PUBLICATIONS

"Agent Intelligence", Retrieved From https://www.servicenow.com/products/agent-intelligence.html Oct. 2017, 6 Pages.

"Assign Tickets", Retrieved From https://www.accelo.com/resources/help/guides/user/modules/tickets/assign-tickets/, Retrieved Date: Jun. 19, 2019, 4 Pages.

"Automate Assignment of Tickets", Retrieved From https://freshdesk.com/helpdesk-automation/automatio-ticket-assignment, Retrieved Date: Jun. 19, 2019, 3 Pages.

"AWS GovCloud (US)", Retrieved From https://aws.amazon.com/govcloud-us/, Retrieved Date: Jun. 19, 2019, 10 Pages.

"Cisco CloudCenter Solution with Service Now", Retrieved From https://www.cisco.com/c/dam/en/us/products/collateral/cloud-systems-management/cloudcenter/at-a-glance-c45-737215.pdf, Jan. 2017, 4 Pages.

"Every Ticket Finds its Match", Retrieved From https://www.zoho.com/desk/ticket-assignment.html, Retrieved Date Jun. 19, 2019, 3 Pages.

"Jira Service Desk: Assign Issues to Specific Agents", Retrieved From https://confluence.atlassian.com/confeval/jira-service-desk-evaluator-resources/jira-service-desk-assign-issues-to-specific-agents, Retrieved Date Jul. 3, 2019, 1 Page.

"Qualys Cloud Platform Receives FedRAMP Authority to Operate", Retrieved From https://www.qualys.com/company/newsroom/news-releases/usa/2016-11-17-qualys-cloud-platform-receives-fedramp-authority-to-operate/, Nov. 17, 2016, 2 Pages.

Boeger, Catherine, "New Teamwork and Security Capabilities for Microsoft 365 Government", Retrieved From https://www.microsoft.com/en-us/microsoft-365/blog/2019/03/13/new-teamwork-and-security-capabilities-for-microsoft-365-government/, Mar. 13, 2019, 4 Pages.

K. Kearns, Donn, "Planning & Management Methods for Migration to a Cloud Environment", Retrieved From https://www.mitre.org/sites/default/files/publications/pr-17-4029-planning-management-methods-migration-to-cloud-environment.pdf, Dec. 2017, 51 Pages.

* cited by examiner

CLEARED USER FACILITATION AND CONTROL SYSTEM

BACKGROUND

Computer systems are currently in wide use. Many computer systems host services that are accessed, and used, by remote client computing systems. For instance, many computing systems provide cloud-based services in which various software applications are provided, as a service, to customers.

These types of services may be offered within different compliance boundaries. The compliance boundaries define what are sometimes referred to as "sovereign clouds". Different sovereign clouds may be divided along the compliance boundaries. Each of the different sovereign clouds may have different compliance rules or regulations that govern how data, data access, and other secure issues are to be treated. Data that resides in a sovereign cloud that is geographically located in one region (such as Europe) may be governed by different compliance rules, and require different credentials or security clearance levels, that are applied in that region. However, data that resides in a sovereign cloud that is located in another geographic region (such as the United States) may be governed by a different set of compliance rules, or require different clearance levels or security credentials, that are used in that region. Thus, the two sovereign clouds are said to be divided by a compliance boundary because they are governed by different compliance rules or because they require different security clearances or clearance levels in order to access the data.

In these types of services, it is not uncommon for incidents to occur (such as bugs, malfunctions, or other issues) that need to be attended to by a support engineer. However, it may be that the support engineer does not have an adequate security clearance level, or other credentials, to access the data within that compliance boundary, or to otherwise perform acts or operations on the services, within that compliance boundary.

The discussion above is merely provided for general background information and is not intended to be used as an aid in determining the scope of the claimed subject matter.

SUMMARY

A request to perform a command or operation on a computing system is received from a support user. A clearance level needed to perform that requested command or operation is identified, and a data store with a pool of cleared users is accessed to identify a cleared user that has an adequate clearance level. The cleared user is assigned to the request. A risk level, corresponding to the requested command or operation is identified and surfaced for the secured user. The requested command or operation can be automatically executed, after it is authorized by the secured user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, a support engineer (or other support user), may need to perform an operation or command on a service that is deployed within a particular compliance boundary. For purposes of this discussion, the terms operation and command will be used interchangeably. However, it may be that the support engineer does not have adequate clearance credentials (e.g., adequate clearance) to access the service or data in order to perform the desired command or operation. In such a scenario, it is common for the support engineer to work with a cleared user, who does have adequate clearance to perform the desired command or operation within the particular compliance boundary, in order to perform the requested command or operation.

This presents a number of different problems. For instance, it is not uncommon for the support engineer to have greater knowledge of how the command or operation will affect the service that it is executed on, than the cleared user. Thus, it can be difficult for the cleared user to know whether the support engineer is requesting the cleared user to perform a risky operation, or one that is a fairly conventional operation (such as a maintenance operation, for example). Similarly, it can be difficult for the support engineer to locate a cleared user, who has adequate clearance. The support engineer may not even know the clearance level, or clearance credentials, that are needed to perform the command or operation. Also, once the support engineer has located a cleared user, and has requested the cleared user to perform the command or operation, then the cleared user often needs to type in the requested command or operation in order to have it executed on the desired service, within the desired compliance boundary. This operation is error prone and time consuming.

The present discussion thus proceeds with respect to a system that automatically identifies a cleared user, for a specific compliance boundary, when a request from a support user is received, to perform a requested command or operation. The system can also identify a risk level associated with the requested command or operation and surface that for the cleared user. Once the cleared user authorizes execution of the requested command or operation, then the system can automatically execute that requested command or operation, without further user involvement. Similarly, the system facilitates communications between the support user and the cleared user over a secure communication channel, which can be entirely conducted within the compliance boundary of the service that is to be operated on.

Figure 1:
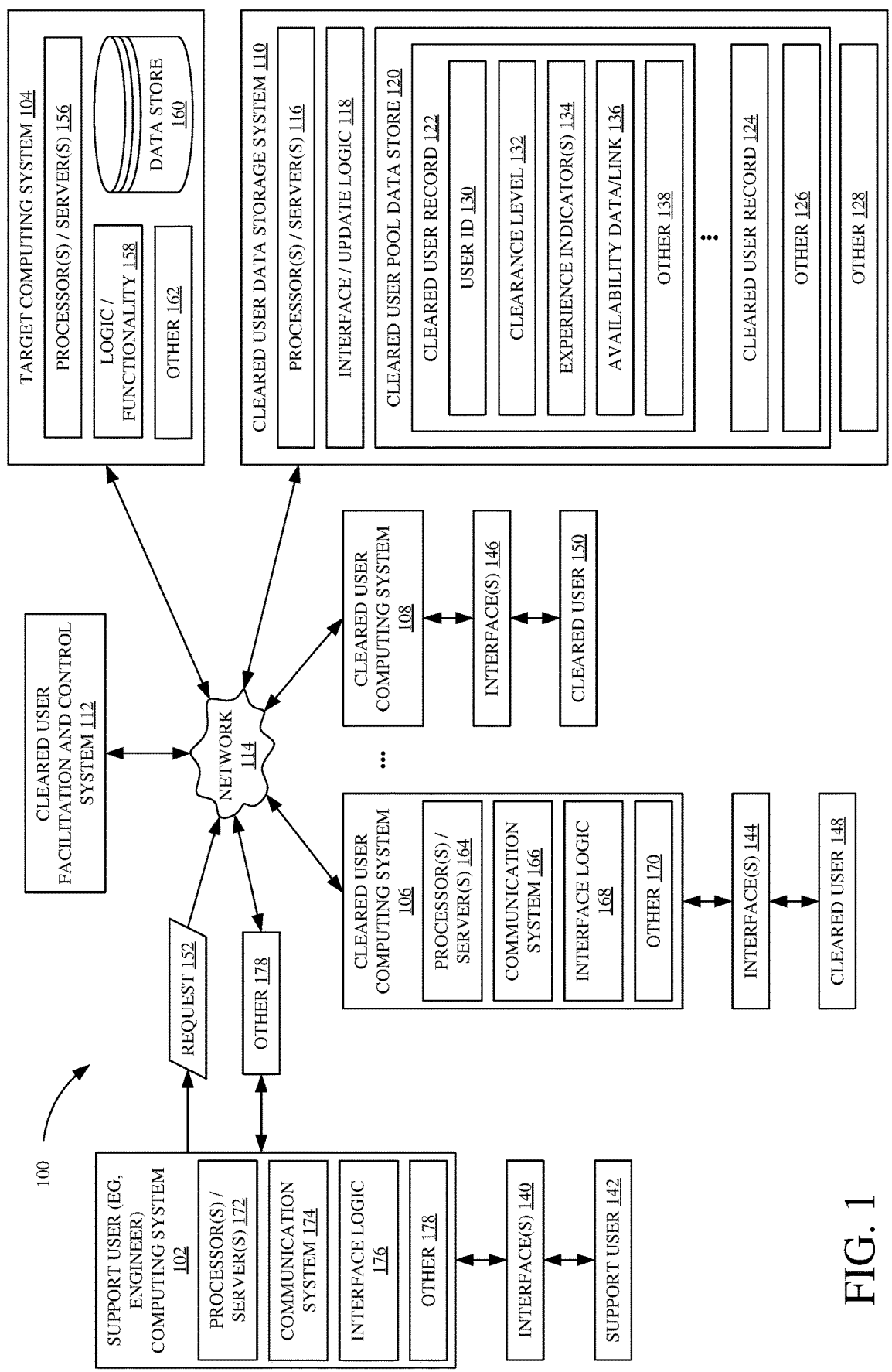
FIG. 1 is a block diagram of one example of a computing system architecture.

FIG. 1 is a block diagram showing one example of a computing system architecture 100. FIG. 1 shows that a support user (such as a support engineer) computing system 102 can communicate with a computing system 104 to be operated on. Similarly, a plurality of cleared user computing systems 106-108 can communicate with systems 102 and 104, and with a cleared user data storage system 110. All of the systems can also illustratively communicate with cleared user facilitation and control system 112, over network 114. Therefore, network 114 can be a wide area network, a local area network, a near field communication network, a cellular communication network, or any of a wide variety of other networks or combinations of networks.

Interface/update logic 118 illustratively exposes an interface to cleared user data storage system 110 so that the cleared user records 122-124 can be added, deleted, updated with new security levels, etc.

Support user computing system 102 is shown generating interfaces 140 for interaction by support user (e.g., support engineer) 142. Cleared user computing systems 106 and 108 are shown generating interfaces 144 and 146 for interaction by cleared users 148 and 150, respectively.

Before describing the overall operation of architecture 100 in more detail, a brief description will first be provided. It is assumed that support user 142 wishes to perform a command or operation on the computing system 104 to be operated on. However, it is also assumed that support user 142 does not have adequate clearance to perform that requested command or operation on computing system 104. Therefore, support user 142 submits a request 152 to perform the command or operation on computing system 104 to cleared user facilitation and control system 112. Cleared user facilitation and control system 112 (which is described in greater detail below with respect to FIG. 2) identifies a clearance or clearance level needed to perform the requested command or operation on computing system 104 and accesses cleared user data storage system 110. Cleared user data storage system 110 illustratively includes records corresponding to cleared users 148 and 150 that identify the particular clearance level that those users have. It therefore identifies a cleared user 148-150 that can perform the requested operation on computing system 104 and automatically assigns that cleared user to the request 152. It also facilitates secure communication between support user 142 and the selected cleared user (e.g., cleared user 148). It identifies a risk level associated with the requested command or operation in request 152 and surfaces that risk level for cleared user 148. Cleared user 148 can provide an input through interfaces 144 authorizing the requested command or operation to be executed within computing system 104. Cleared user facilitation and control system 112 then automatically extracts the command or operation from the communication between support user 142 and cleared user 148 and automatically executes that command or operation within computing system 104. It can archive all of the communication, corresponding to the requested command or operation, in a secure archive for later analysis.

A brief description of some of the items in architecture 100, and their operation will now be provided.

In the example illustrated, cleared user data storage system 110 illustratively includes one or more processors or servers 116, interface/update logic 118, and cleared user pool data store 120 (which, itself, includes a plurality of cleared user records 122-124, and it can include other items 126). Cleared user data storage system 110 can also include other items 128. Each of the cleared user records 122-124 can include a user ID 130 that identifies a different corresponding cleared user, a clearance level 132 associated with the corresponding cleared user, experience indicators 134 that identify an experience level, or a subject matter experience, of the corresponding cleared user, availability data/link 136 which identifies the availability (or links to the calendar of) the corresponding cleared user, and it can include other items 138.

The computing system 104, to be operated on, can include one or more processors or servers 156, a variety of different logic or functionality 158 that is used to implement the service performed by computing system 104, data store 160 which can store customer data or other data, and it can include other items 162.

Cleared user computing systems 106 and 108 can be similar or different. For the sake of the present discussion, it is assumed that they are similar so that only cleared user computing system 106 will be described in more detail. Cleared user computing system 106 illustratively includes one or more processors or servers 164, communication system 166, interface logic 168, and it can include other items 170. Interface logic 168 illustratively generates interfaces 144 for interaction by cleared user 148. Cleared user 148 illustratively interacts with interfaces 144 in order to control and manipulate cleared user computing system 106 and some other systems in FIG. 1. Communication system 166 is illustratively configured to communicate over network 114 and to provide any other desired communication. Therefore, the communication system 166 may vary depending on the type of network 114 being used. It can, for instance, be a chat message communication system, or any of a wide variety of other types of communication systems.

Support user computing system 102 illustratively includes one or more processors or servers 172, communication system 174, interface logic 176, and it can include other items 178. Communication system 174, as with communication system 166, may vary depending upon the type of network 114 or the type of other communications that are to be used. It can be a chat message communication system or a wide variety of other communication systems.

Interface logic 176 illustratively generates interfaces 140 for interaction by support user 142. Support user 142 illustratively interacts with interfaces 140 in order to control and manipulate support user computing system 102 and some other systems in architecture 100.

As briefly discussed above, support user 142 can use support user computing system 102 to submit a request 152 to perform an operation on the computing system 104 to be operated on. Computing system 102 can communicate with other systems over network 104 in a wide variety of other ways as well. This other communication is indicated by block 178.

Figure 2:
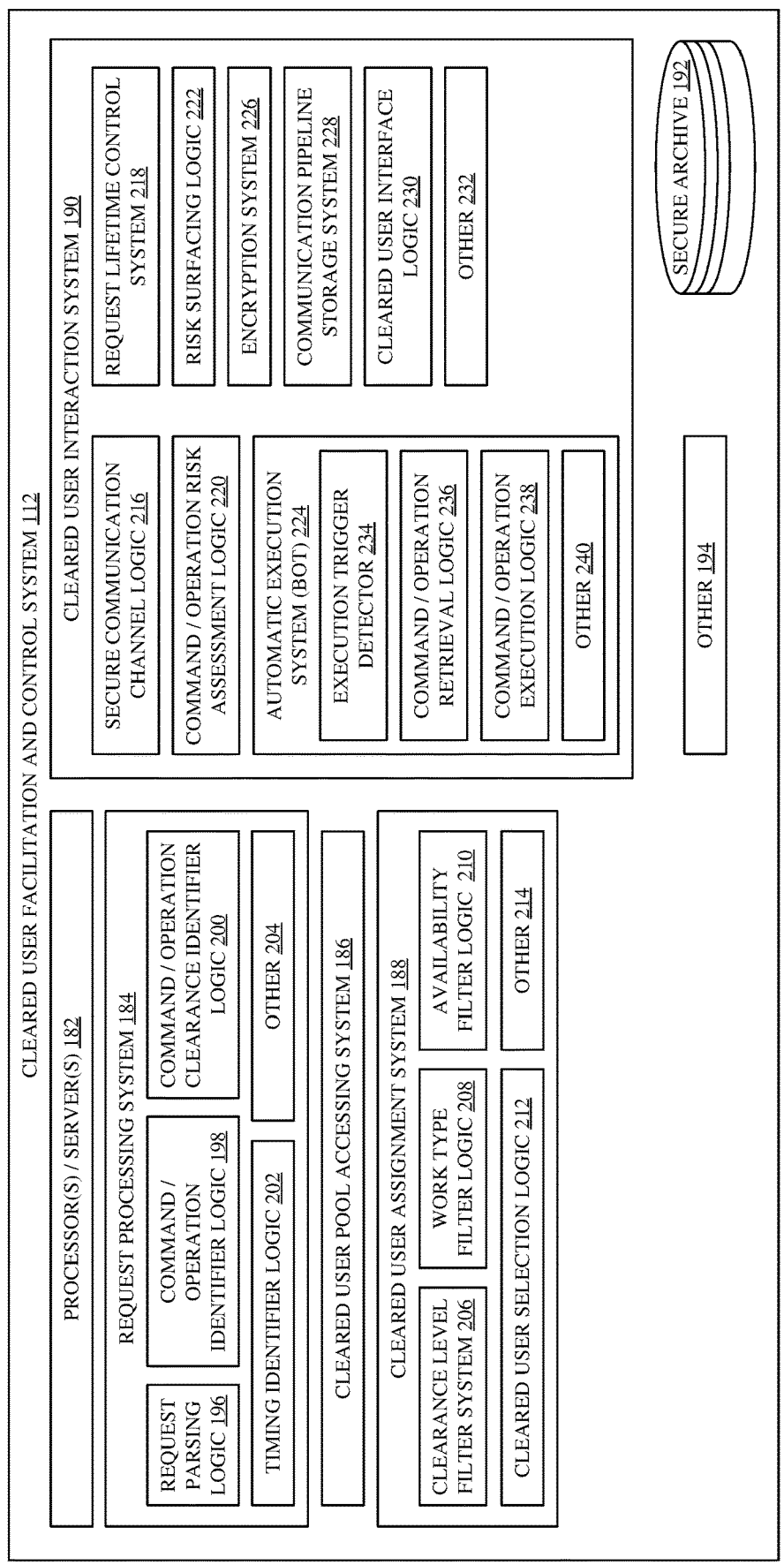
FIG. 2 is a block diagram showing one example of a cleared user facilitation and control system, in more detail.

FIG. 2 is a block diagram showing one example of cleared user facilitation and control system 112, in more detail. System 112 illustratively includes one or more processors or servers 182, request processing system 184, cleared user pool accessing system 186, cleared user assignment system 188, cleared user interaction system 190, secure archive 192, and it can include other items 194. Request processing system 184 illustratively includes request parsing logic 196, command/operation identifier logic 198, command/operation clearance identifier logic 200, timing identifier logic 202, and it can include other items 204. Cleared user assignment system 188 illustratively includes clearance level filter system 206, work type filter logic 208, availability filter logic 210, cleared user selection logic 212, and it can include other items 214. Cleared user interaction system 190 can include secure communication channel logic 216, request lifetime control system 218, command/operation risk assessment logic 220, risk surfacing logic 222, automatic execution system (bot) 224, encryption system 226, communication pipeline storage system 228, cleared user interface logic 230, and it can include other items 232. Automatic execution system (bot) 224 can include execution trigger detector 234, command/operation retrieval logic 236, command/operation execution logic 238, and it can include other items 240.

Briefly, by way of operation, request processing system 184 receives a request 152 from a support user computing system 102, to perform a command or operation on a computing system 104 to be operated on. Request parsing logic 196 parses the request so that command/operation identifier logic 198 can identify the particular command or operation to be performed and so that command/operation clearance identifier logic 200 can identify the clearance (e.g., clearance level, security clearance credentials, etc.) that are needed to perform that operation in the requested environment (e.g., in the requested compliance boundary, on the requested server or other machine, etc.). Timing identifier logic 202 identifies the requested timing corresponding to the command or operation to be performed. For instance, it can identify how long it will take to perform the requested command or operation, among other things.

Cleared user pool accessing system 186 illustratively interacts with cleared user data storage system 110 (shown in FIG. 1) in order to access the cleared user pool data store 120. Using cleared user pool accessing system 186, cleared user assignment system 188 identifies a cleared user 148-150 from the cleared user records 122-124 in the cleared user pool data store 120, who has adequate clearance to perform the requested operation in the requested environment, and who also has adequate time availability, and experience. Thus, clearance level filter system 206 filters the various cleared user records 122-124 based upon the clearance level 132 for the corresponding users. It identifies only cleared user records 122-124 that have an adequate clearance level to perform the requested command or operation in the requested environment.

Availability filter logic 210 then filters those records based upon the availability data or link 136. For instance, if the requested command or operation is to be performed immediately, and will take two hours, it may be that some of the cleared users, who have adequate clearance, do not have the availability to help with the request. Similarly, work type filter logic 208 illustratively filters the cleared user records 122-124 based upon the experience indicators 134 that indicate the types of commands or operations the corresponding user has worked with, or other work experience, that the corresponding user has. Thus, when a list of cleared users has been identified based on having adequate clearance and availability, then work type filter logic 208 may filter the remaining cleared user records to identify a cleared user that has a most applicable experience level, based upon the experience indicators 134 in that user's corresponding cleared user record. It will be noted that the records 122-124 can be filtered in a different order (e.g., availability, clearance level, experience, or other orders), and other filters can also be applied.

Cleared user selection logic 212 then selects a particular cleared user (for the present example assume it is cleared user 148), and assigns that cleared user 148 to the request 152.

Cleared user interaction system 190 then facilitates communication between the support user 142 that submitted the request 152 and the cleared user 148 who has been assigned to the request 152. Therefore, secure communication channel logic 216 facilitates secure communication on a communication channel that is within the compliance boundary of the computing system 104 to be operated on. By way of example, logic 216 may facilitate a chat communication channel or another communication channel that is secure and within the desired compliance boundary. Request lifetime control system 218 allows cleared user 148 to open a ticket or other record corresponding to request 152 and to close that ticket or record, once the request 152 has been serviced.

Command/operation risk assessment logic 220 receives an indication of the particular command or operation to be performed from command/operation identifier logic 198. It then assesses the risk corresponding to that requested command or operation. By way of example, the requested command or operation may be a routine maintenance command or operation that has been executed many times on the computing system 104, without any negative consequences. In that scenario, the risk assessment may be relatively low. However, it may be that command/operation risk assessment logic 220 has never encountered this particular command or operation before, nor is there any record of it being performed on the target computing system 104. This may carry a relatively higher risk level. Similarly, command/operation risk assessment logic 220 may identify a historical record indicating that the last time this requested command or operation was performed, it resulted in significant downtime of the target computing system 104. In that case, the risk level may be extreme. Of course, the risk level can be assessed in a wide variety of other ways, using different rules, models, or other risk assessment logic as well.

Once the risk level has been identified by logic 220, it is provided to risk surfacing logic 222 which illustratively generates an output indicative of that risk level for surfacing to cleared user 148. It may be that cleared user 148 does not have sufficient knowledge to know whether the requested operation is high risk or low risk. Thus, when the risk level is surfaced for the cleared user 148, this provides the cleared user 148 with a measure of how risky the request is. Risk surfacing logic 222 can also illustratively surface an authorization actuator, along with the risk level, or separately therefrom. When cleared user 148 actuates the execution actuator, this may trigger automatic execution of the requested command or operation.

Automatic execution system (bot) 224 automatically executes the requested command or operation, without the cleared user 148 needing to perform any other operations other than authorizing performance of the requested command or operation. Thus, execution trigger detector 234 detects an execution trigger indicating that cleared user 148 has indicated that he or she wishes the requested command or operation to be executed on computing system 104. This can be done by actuating an authorization actuator, or by providing another input.

Once the execution trigger has been detected, command/operation retrieval logic 236 retrieves or extracts the requested command or operation from the request 152. For instance, assume that the request 152 is communicated to cleared user 148 using a secure chat communication system. When the cleared user 148 authorizes execution of the command or operation, then command/operation retrieval logic 236 parses the chat message to identify the command or operation that is to be executed. It may do this based upon markups in the chat message, based upon its own processing of the chat message, or in other ways. Once it has extracted the command or operation (or an identifier identifying the requested command or operation), it provides it to command/operation execution logic 238 which automatically executes that command or operation within computing system 104. In this way, cleared user 148 need not retype anything in order to have the requested command or operation executed. It is automatically executed based upon cleared user 148 authorizing its execution.

Figure 3A:
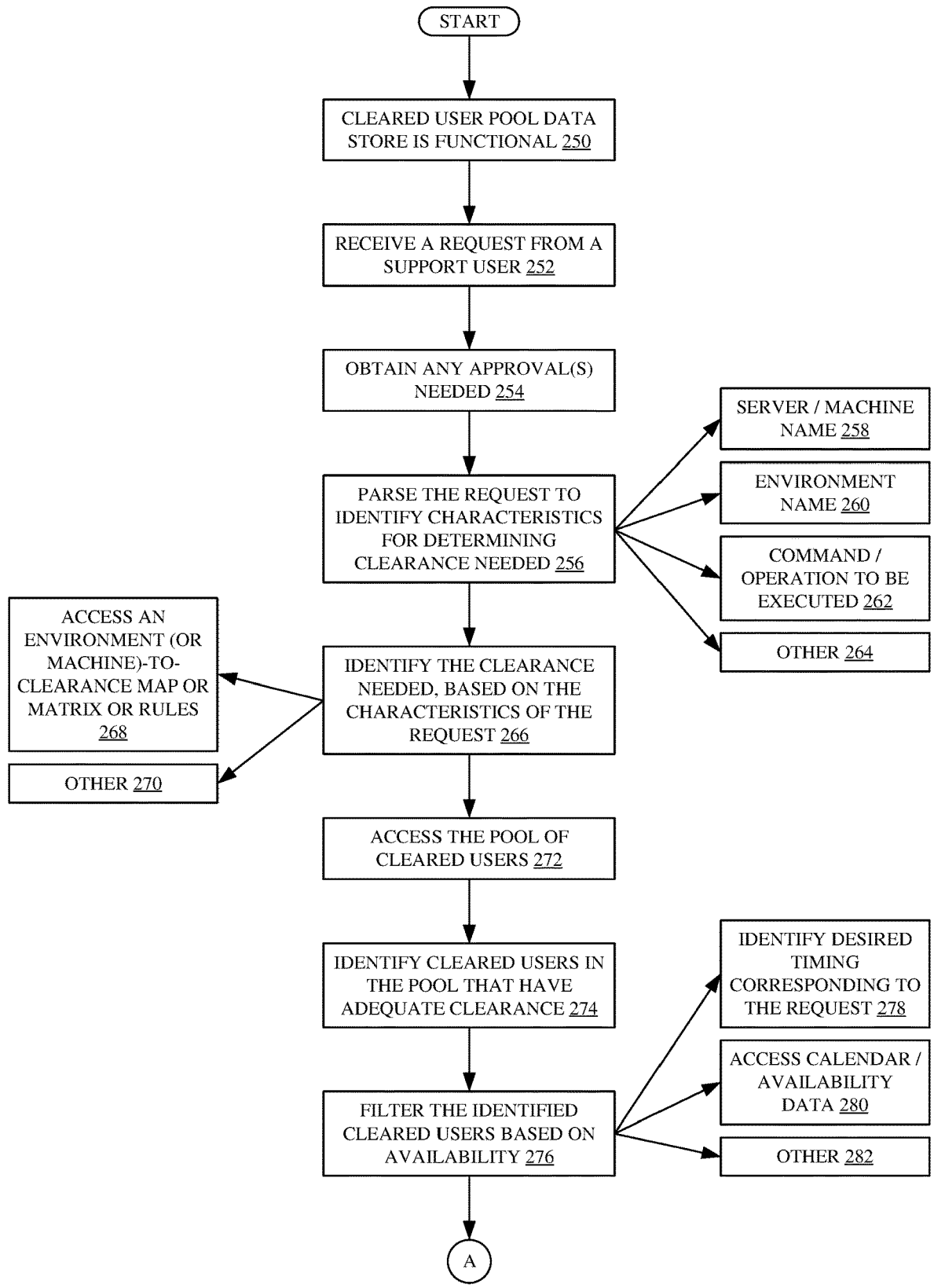
FIGS. 3A and 3B (collectively referred to herein as FIG. 3) illustrate a flow diagram showing one example of the operation of the cleared user facilitation and control system in assigning a cleared user to a received request to perform a command or operation.
Figure 3B:
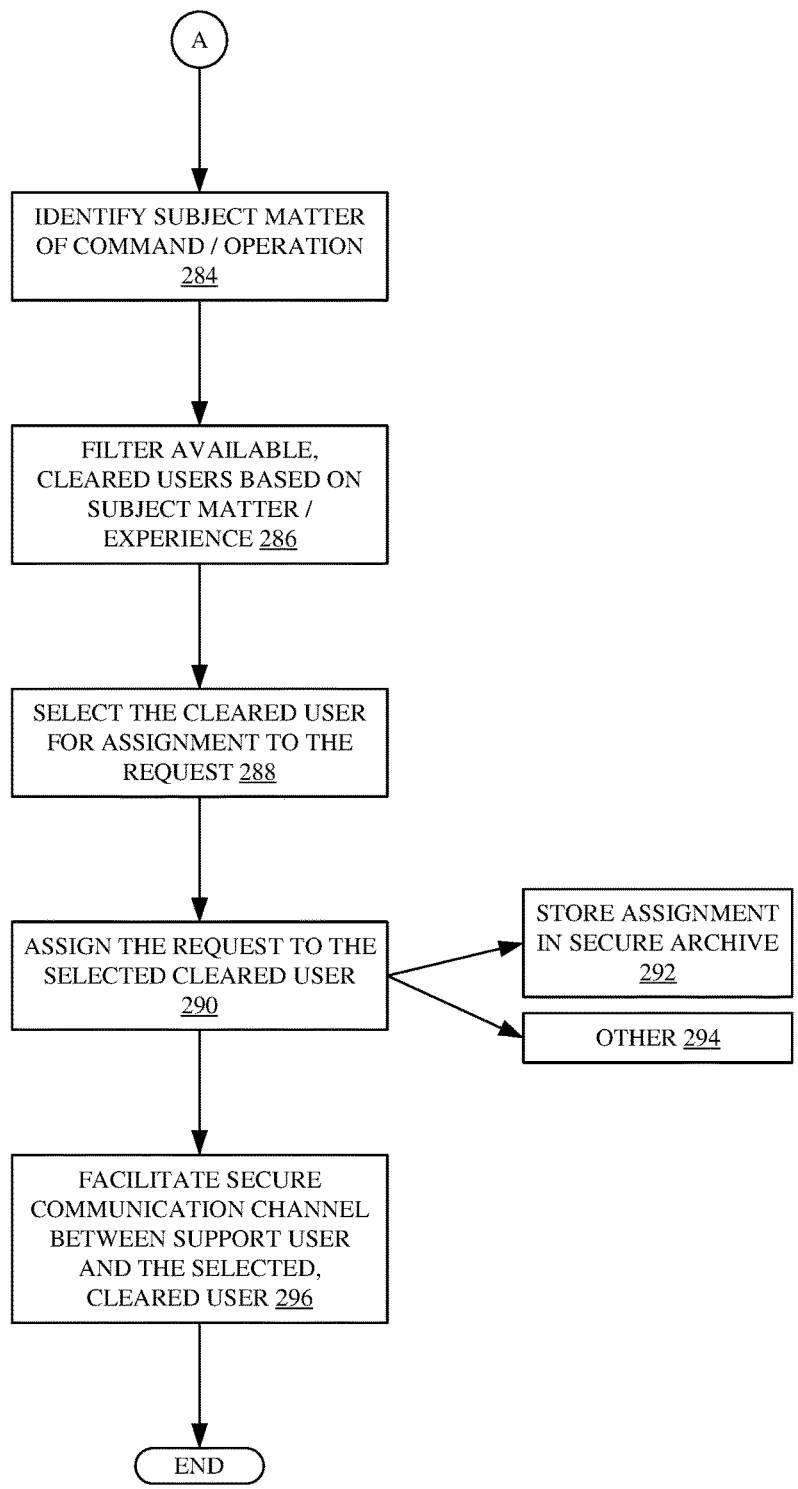

FIGS. 3A and 3B (collectively referred to herein as FIG. 3) illustrate a flow diagram showing one example of how cleared user facilitation and control system 112 processes a request 152 from support user computing system 102 and assigns a cleared user (e.g., cleared user 148) to help with that request.

It is first assumed that cleared user pool data store 120 is functional and populated with cleared user records 122-124 corresponding to different cleared users. The records include a user ID 130 that identifies the user and a clearance level 132 that identifies the clearance level or clearance credentials of that user. It includes availability data or a link to the availability data 136 and it can include other items. Having the cleared user data store populated is indicated by block 250 in the flow diagram of FIG. 3.

Request processing system 184 then receives a request 152 from a support user computing system 102 in order to perform a command or operation within a computing system 104. Receiving the request is indicated by block 252. It may be that a separate approval system obtains any approvals that are needed for support user 142 to submit and process the request 152. Obtaining any needed approvals is indicated by block 254.

Request parsing logic 196 then parses the request to identify characteristics for determining what type of clearance is needed. This is indicated by block 256. For instance, it may parse the request to identify the server or machine name where the requested command or operation is to be executed. This is indicated by block 258. It may parse the request 152 to identify the particular environment where the requested command or operation is to be executed. This is indicated by block 260. It may use command/operation identifier logic 198 to identify the particular command or operation that is being requested. This is indicated by block 262. It can parse the request 152 to identify a wide variety of other information or characteristics that can be used for determining an adequate clearance level that is needed to execute the requested command or operation. This is indicated by block 264.

Command/operation clearance identifier logic 200 then identifies the clearance needed, based upon the characteristics of the request 152. This is indicated by block 266. For instance, it can access an environment (or machine)-to-clearance map, or another lookup table or matrix, or apply a set of rules that map from the characteristics identified in step 256 to a clearance level that is needed to perform the requested command or operation. Accessing an environment-to-clearance map, a matrix or a set of rules is indicated by block 268. The clearance can be identified in a wide variety of other ways as well, and this is indicated by block 270.

Cleared user pool accessing system 186 then accesses the cleared user data storage system 110 and particularly the cleared user pool data store 120. Accessing the pool of cleared users is indicated by block 272.

Clearance level filter system 206 then accesses the various cleared user records 122-124 and filters them to identify corresponding cleared users, in the pool, that have an adequate clearance to perform the requested command or operation on the requested computing system 104, in the requested environment, etc. This is indicated by block 274.

Once cleared users, that have adequate clearance, have been identified by clearance level filter system 206, then availability filter logic 210 can identify which of those cleared users has the availability, based upon the timing identified by timing identifier logic 202. Filtering the identified cleared users based on availability is indicated by block 276. It can identify desired timing corresponding to the request 152, as indicated by block 278. It can access the calendar/availability data or link 136 in the various records 122-124. This is indicated by block 280. It can filter the cleared users based on availability in other ways as well, and this is indicated by block 282.

Once a set of cleared users that have adequate clearance, and adequate availability, are identified, then work type filter logic 208 filters those users based on the subject matter of the command or operation that is requested in request 152. It first identifies the subject matter of the command or operation as indicated by block 284. It then filters the available, cleared users based on the subject matter or experience identified by the experience indicators 134 in the cleared user records corresponding to those users. This is indicated by block 286.

Cleared user selection logic 212 then selects a cleared user for assignment to the request 152. This is indicated by block 288, and it will be assumed for the sake of the present discussion that cleared user selection logic 212 selects cleared user 148.

Cleared user selection logic 212 then assigns the request 152 to the selected cleared user 148. This is indicated by block 290. It can store an indication of that assignment in secure archive 192 as well. This is indicated by block 292. It can assign the request to the selected secured user 148 in other ways as well, and this is indicated by block 294.

Secure communication channel logic 216 then facilitates a secure communication channel between support user 142 and the selected, cleared user 148. This is indicated by block 296. For instance, it can open or establish a chat message communication channel between the two users, within the desired compliance boundaries. It can establish other secured communication channels as well.

Figure 4:
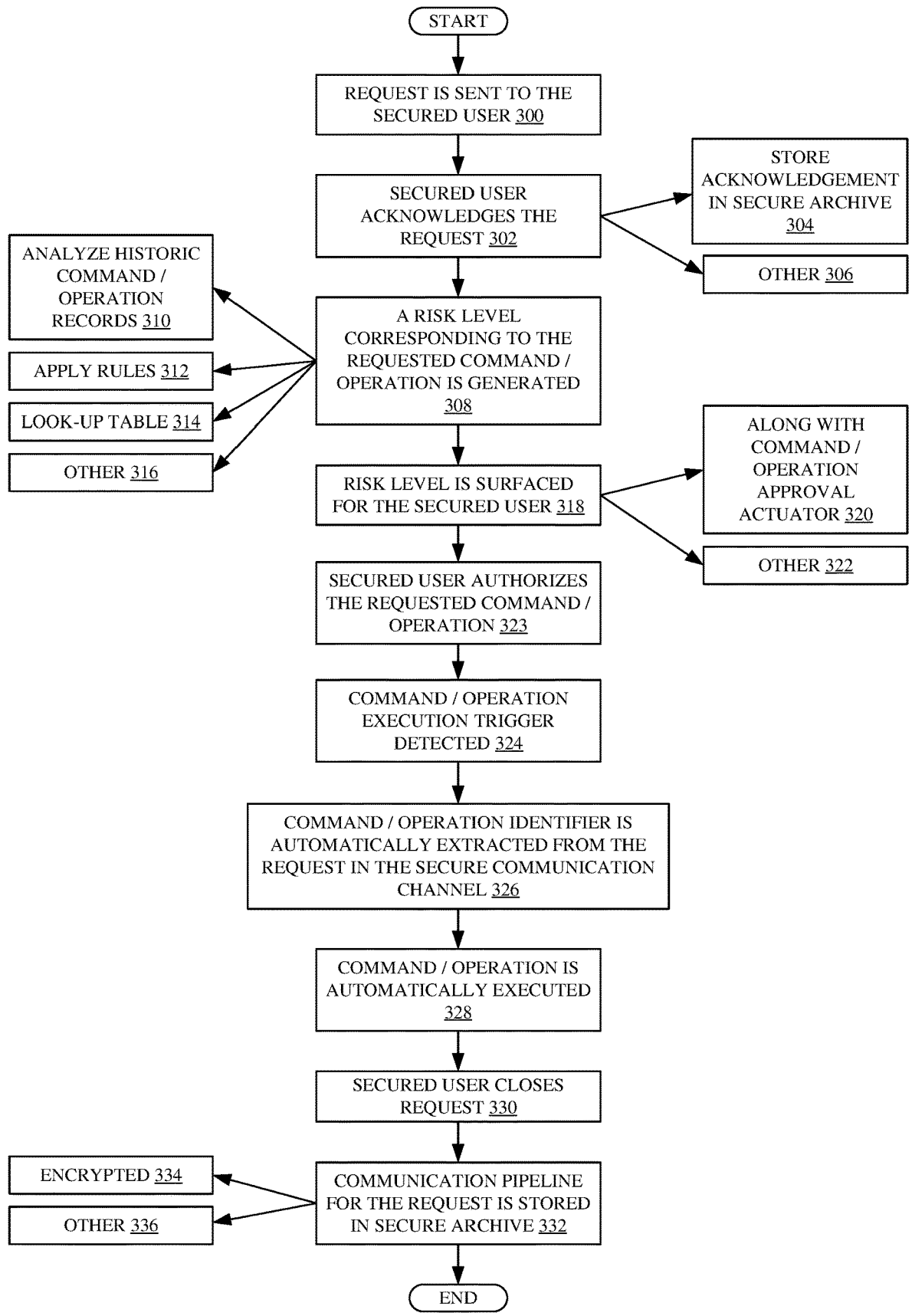
FIG. 4 is a flow diagram illustrating one example of the operation of the cleared user facilitation and control system in surfacing a risk level corresponding to the requested command or operation, and in automatically executing the requested command or operation.

FIG. 4 is a flow diagram illustrating one example of the operation of cleared user interaction system 190 in assessing a risk level corresponding to the requested command or operation, surfacing that risk level for the assigned cleared user 148, and automatically executing it, when authorized to do so. It is first assumed that secure communication channel logic 216 sends the request 152 to the assigned cleared user 148 over the secure communication channel. This is indicated by block 300 in the flow diagram of FIG. 4. At some point, secured user 148 uses interfaces 144 and communication system 166 to acknowledge that he or she has received the request 152 and accepted the assignment. Acknowledging the request is indicted by block 302. Request lifetime control system 218 can then open a record corresponding to the request (if it is not already open) and store the acknowledgement by assigned cleared user 148 in the secure archives 192. This is indicated by block 304. The secured user 148 can acknowledge the request in other ways as well, and this is indicated by block 306.

Command/operation risk assessment logic 220 then identifies or generates a risk level corresponding to the requested command or operation. This is indicated by block 308. In doing so, logic 220 can analyze historic command/operation records in secure archive 192 and/or in the data stores 162 in target computing system 104 to determine whether the requested command or operation has been executed before, whether it has been executed in the requested environment before, the number of times it has been executed, the results of execution (e.g., downtime, successful execution, etc.). Analyzing historic command/operation records is indicated by block 310.

Command/operation risk assessment logic 220 can generate a risk level by applying rules. For instance, rules may map from a command or operation to a risk level, based upon how intrusive the command or operation is, based upon the sensitivity of the data to be operated on, or based on other criteria. This is indicated by block 312. Logic 220 may access a lookup table that provides a matrix of commands or operations, environments, data to be operated on and risk levels. Accessing a lookup table is indicated by block 314. Command/operation risk assessment logic 220 can generate the risk level in a wide variety of other ways as well, and this is indicated by block 316.

Risk surfacing logic 222 then generates an output that can be used to surface the risk level, to the assigned cleared user 148. Surfacing the risk level for the secured user is indicated by block 318. In one example, the risk level is surfaced along with an actuator that may describe the command or operation to be executed. When the actuator is actuated by user 148, this can be detected by cleared user interface logic 230 (or elsewhere) and act as a trigger that begins execution of the requested command or operation. Surfacing the risk level of the command or operation, along with a command/operation approval actuator, is indicated by block 320. The risk level can be surfaced in a wide variety of other ways as well, and this is indicated by block 322.

User 148 then authorizes the requested command/operation. This can be done, for example, by interacting with the approval actuator. Authorizing the requested command/operation is indicated by block 323. When user 148 authorizes execution of the requested command or operation, then execution trigger detector 234 detects an execution trigger. This is indicated by block 324.

In response, command/operation retrieval logic 236 automatically extracts the command or operation from the request 152 that was provided in the secure communication channel. This is indicated by block 326. As discussed above, this can be done by retrieving a command/operation identifier generated by command/operation identifier logic 198, by again parsing the request to identify the command or operation, or in other ways.

Command/operation execution logic 238 then automatically executes the command or operation in the target computing system 104. This is indicated by block 328.

Once cleared user 148 and support user 142 have agreed that the request 152 has been satisfied, then secured user 148 closes the record corresponding to that request. This is indicated by block 330. An indication that the record has been closed can be stored in secure archive 192 as well.

Communication pipeline storage system 228 then copies the message in the entire communication pipeline (all communications in the secure communication channel between users 142 and 148 corresponding to request 152), and stores them in secure archive 192. This is indicated by block 332. It will be noted that, in one example, secure archive 192 is a read only data store so that the archived records cannot later be changed.

Also, in one example, encryption system 226 encrypts the communication pipeline, and other records or information stored in secured archive 192. This is indicated by block 334. The communication pipeline can be stored in the secure archive in other ways as well, and this is indicated by block 336.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
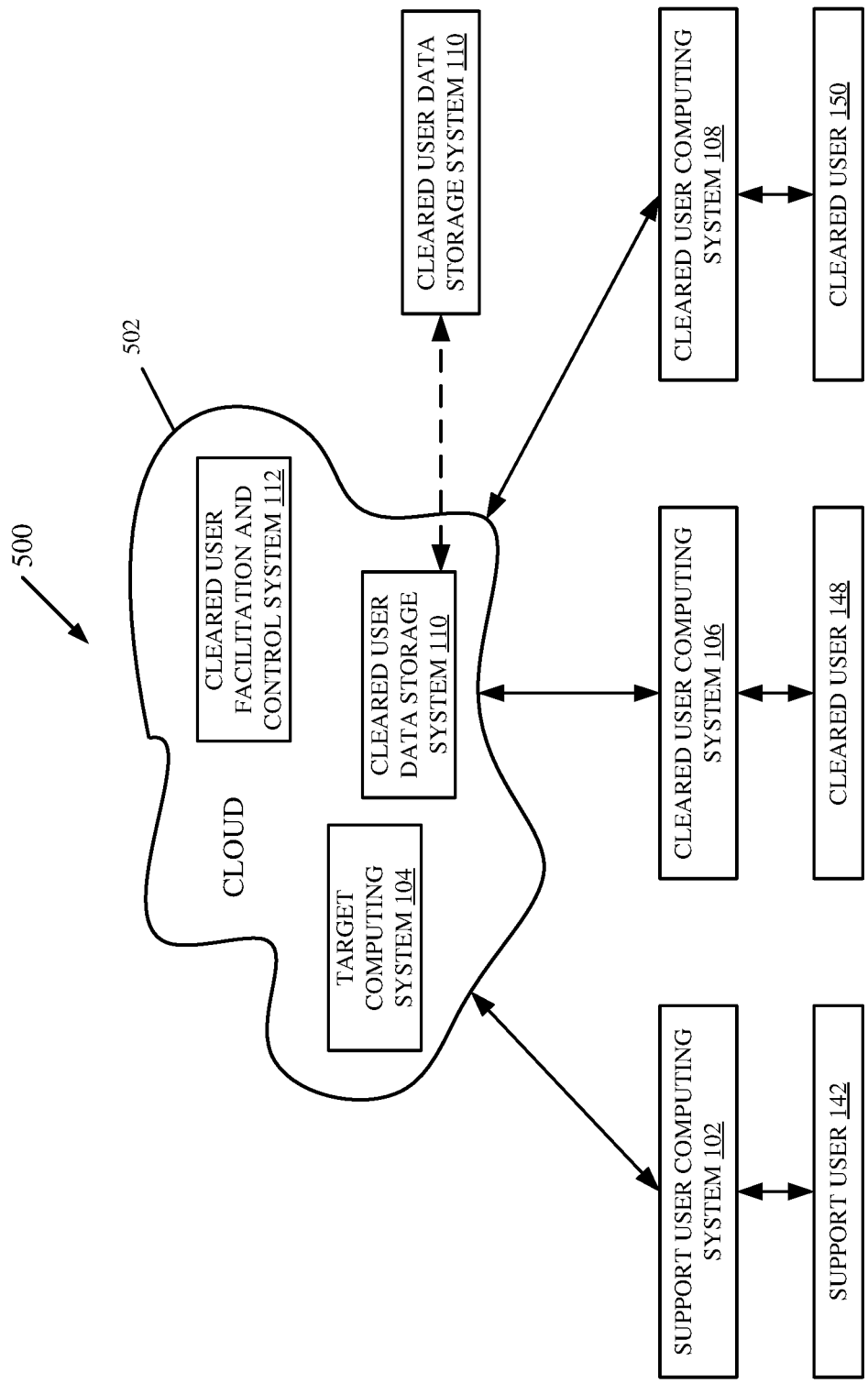
FIG. 5 is a block diagram showing one example of the computing system architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that systems 104, 110 and 112 can be located in cloud 502 (which can be public, private, or a combination where portions are public while others are private). Therefore, users 142, 148 and 150 uses user devices to access those systems through cloud 502.

FIG. 5 also depicts another example of a cloud architecture. FIG. 5 shows that it is also contemplated that some elements of architecture 100 can be disposed in cloud 502 while others are not. By way of example, cleared user data storage system 110 can be disposed outside of cloud 502, and accessed through cloud 502. Regardless of where they are located, they can be accessed directly by the users through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
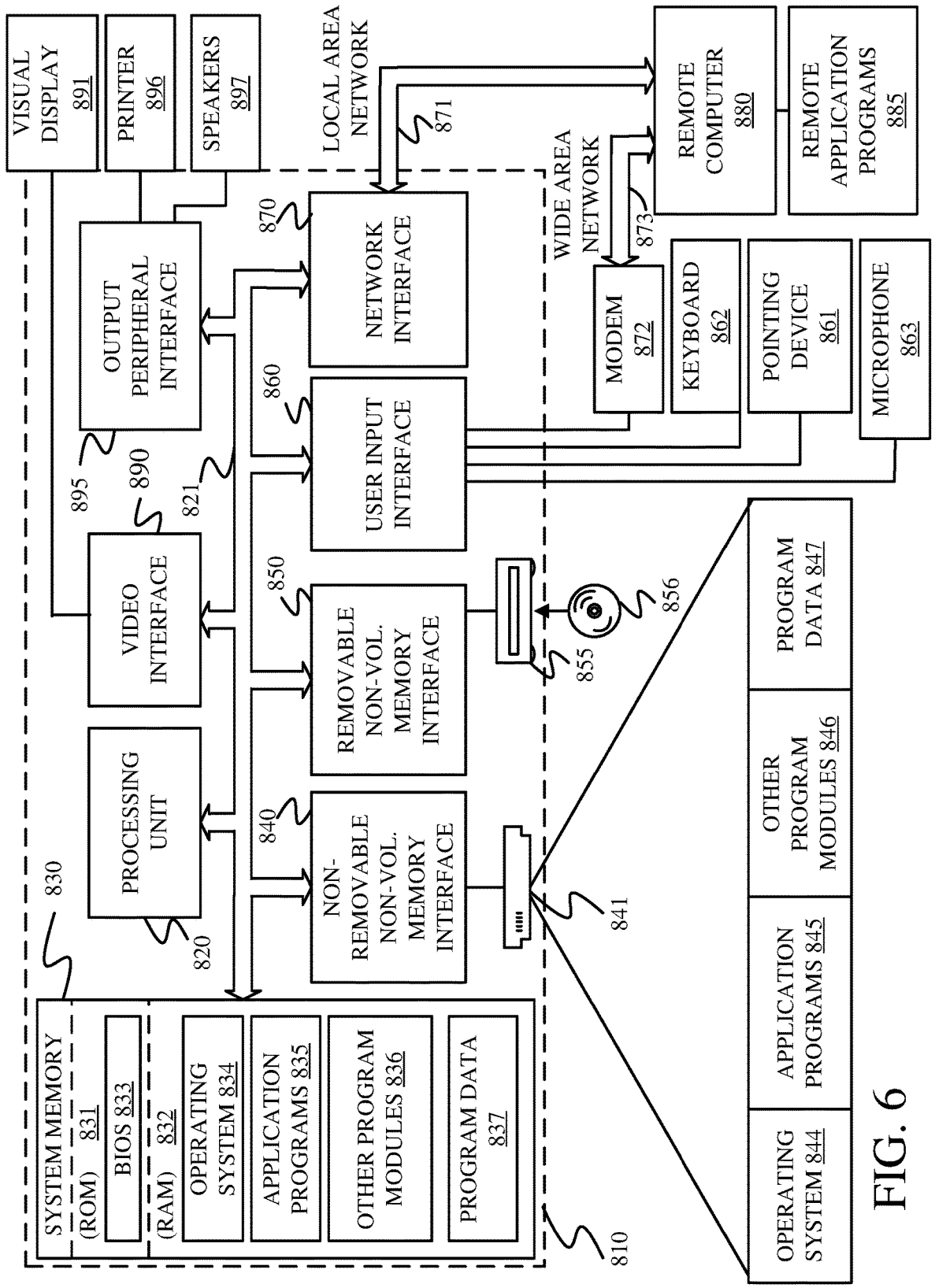
FIG. 6 is a block diagram showing one example of a computing environment that can be used in the architectures illustrated in the previous figures.

FIG. 6 is one example of a computing environment in which architecture 100, or parts of it, (for example) can be deployed. With reference to FIG. 6, an example system for implementing some embodiments includes a computing device in the form of a computer 810 configured to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
a request processing system that receives a request to execute a command on a target computing system in a computing environment and identifies a clearance level adequate to execute the command on the target computing system in the computing environment;
a cleared user pool accessing system that accesses a set of cleared user records, each corresponding to a cleared user and each having a corresponding clearance level indicator indicating a clearance level for the corresponding user;
cleared user assignment system that assigns a cleared user to the request based on the cleared user records and based on the clearance level adequate to execute the command on the target computing system in the computing environment; and
a cleared user interaction system that sends the request to the assigned cleared user.

Example 2 is the computing system of any or all previous examples wherein the request processing system comprises:
command clearance identifier logic configured to identify the clearance level adequate to execute the command and generate an adequate clearance level indicator indicative of the adequate clearance level.

Example 3 is the computing system of any or all previous examples wherein the cleared user assignment system comprises:
a clearance level filter system configured to filter the set of cleared user records, based on the corresponding clearance level indicator and the adequate clearance level, to identify clearance level records that have a clearance level indicator that meets the adequate clearance level.

Example 4 is the computing system of any or all previous examples wherein each of the cleared user records includes an availability indicator indicating an availability of the corresponding cleared user and wherein the request processing system comprises:
timing identifier logic configured to identify a timing corresponding to the request to execute the command.

Example 5 is the computing system of any or all previous examples wherein the cleared user assignment system comprises:
availability filter logic configured to filter the cleared user records based on the availability indicator and the identified timing corresponding to the request to execute the command.

Example 6 is the computing system of any or all previous examples wherein each of the cleared user records includes an experience indicator indicating an experience of the corresponding cleared user and wherein the cleared user assignment system comprises:
work type filter logic configured to filter the cleared user records based on a subject matter of the command to be executed and the experience indicator in each of the cleared user records.

Example 7 is the computing system of any or all previous examples wherein the cleared user interaction system comprises:
command risk assessment logic configured to identify a risk indicator indicative of a risk level corresponding to the command.

Example 8 is the computing system of any or all previous examples wherein the cleared user interaction system comprises:

risk surfacing logic configured to generate a risk output, based on the risk indicator, for surfacing to the assigned cleared user.

Example 9 is the computing system of any or all previous examples wherein the cleared user interaction system comprises:

an automatic execution system configured to detect an execution trigger and automatically execute the command based on the execution trigger.

Example 10 is the computing system of any or all previous examples wherein the automatic execution system comprises:

an execution trigger detector configured to detect an authorization input indicative of the assigned cleared user authorizing execution of the command and to generate a trigger detected signal; and command execution logic configured to automatically execute the command on the target computing system in the computing environment based on the trigger detected signal.

Example 11 is the computing system of any or all previous examples wherein the request is received from a client computing system and wherein the cleared user interaction system comprises:

secure communication channel logic configured to facilitate communication between the client computing system and the cleared user over a communication channel that is in a same compliance boundary as the target computing system.

Example 12 is the computing system of any or all previous examples wherein the request is received in a message on the communication channel and wherein the automatic execution system comprises:

command retrieval logic configured to automatically retrieve the command from the message on the communication channel and provide the command to the command execution logic for automatic execution.

Example 13 is the computing system of any or all previous examples wherein the cleared user interaction system comprises:

a communication pipeline storage system configured to retrieve messages on the communication channel related to the request and to provide the messages to an archive data store.

Example 14 is a computer implemented method, comprising:

receiving, at a request processing system, a request to execute a command on a target computing system in a computing environment;

identifying a clearance level adequate to execute the command on the target computing system in the computing environment;

accessing a set of cleared user records, each corresponding to a cleared user and each having a corresponding clearance level indicator indicating a clearance level for the corresponding user;

assigning a cleared user to the request based on the cleared user records and based on the clearance level adequate to execute the command on the target computing system in the computing environment; and sending the request to the assigned cleared user.

Example 15 is the computer implemented method of any or all previous examples wherein assigning the cleared user comprises:

filtering the set of cleared user records, based on the corresponding clearance level indicator and the adequate clearance level, to identify clearance level records that have a clearance level indicator that meets the adequate clearance level.

Example 16 is the computer implemented method of any or all previous examples wherein each of the cleared user records includes an availability indicator indicating an availability of the corresponding cleared user and wherein assigning the cleared user comprises:

identifying a timing corresponding to the request to execute the command; and filtering the cleared user records based on the availability indicator and the identified timing corresponding to the request to execute the command.

Example 17 is the computer implemented method of any or all previous examples wherein each of the cleared user records includes an experience indicator indicating an experience of the corresponding cleared user and wherein assigning the cleared user comprises:

filtering the cleared user records based on a subject matter of the command to be executed and the experience indicator in each of the cleared user records.

Example 18 is the computer implemented method of any or all previous examples wherein sending the request to the assigned cleared user comprises:

identifying a risk indicator indicative of a risk level corresponding to the command; and generating a risk output, based on the risk indicator, for surfacing to the assigned cleared user.

Example 19 is the computer implemented method of any or all previous examples and further comprising:

detecting an authorization input indicative of the assigned cleared user authorizing execution of the command;

generating a trigger detected signal; and automatically executing the command on the target computing system in the computing environment based on the trigger detected signal.

Example 20 is a computing system, comprising:

a request processing system that receives a request to execute a command on a target computing system in a computing environment and identifies a clearance level adequate to execute the command on the target computing system in the computing environment;

a cleared user pool accessing system that accesses a set of cleared user records, each corresponding to a cleared user and each having a corresponding clearance level indicator indicating a clearance level for the corresponding user;

a cleared user assignment system that assigns a cleared user to the request based on the cleared user records and based on the clearance level adequate to execute the command on the target computing system in the computing environment;

command risk assessment logic configured to identify a risk indicator indicative of a risk level corresponding to the command;

risk surfacing logic configured to generate a risk output, based on the risk indicator, for surfacing to the assigned cleared user;

a cleared user interaction system that sends the request and the risk output to the assigned cleared user; and an automatic execution system configured to detect an execution trigger indicative of the assigned cleared user authorizing execution of the command and to automatically execute the command based on the execution trigger.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor; and
   memory storing instructions executable by the at least one processor, wherein the instructions, when executed, cause the computing system to:
   receive a request to execute a command on a target computing system in a computing environment, the target computing system comprising a computing service within a particular compliance boundary;
   identify a command clearance level that indicates a security credential, in the particular compliance boundary, adequate to execute the command on the target computing system in the computing environment;
   access a set of cleared user records, wherein each cleared user record corresponds to a cleared user, and has a corresponding clearance level indicator indicating a user clearance level for the corresponding cleared user;
   assign a cleared user to the request based on a determination that the cleared user has a user clearance level, indicated by the clearance level indicator in the cleared user record corresponding to the cleared user, that meets the command clearance level adequate to execute the command on the target computing system; and
   send the request to the assigned cleared user.

2. The computing system of claim 1 wherein the instructions cause the computing system to:
   identify the command clearance level adequate to execute the command and generate an adequate clearance level indicator indicative of the adequate command clearance level; and
   filter the set of cleared user records, based on the corresponding clearance level indicator and the adequate command clearance level, to identify clearance level records that have a clearance level indicator that meets the adequate command clearance level.

3. The computing system of claim 2 wherein each of the cleared user records includes an availability indicator indicating an availability of the corresponding cleared user and wherein the instructions cause the computing system to:
   identify a timing corresponding to the request to execute the command.

4. The computing system of claim 3 wherein the instructions cause the computing system to:
   filter the cleared user records based on the availability indicator and the identified timing corresponding to the request to execute the command.

5. The computing system of claim 2 wherein each of the cleared user records includes an experience indicator indicating an experience of the corresponding cleared user and wherein the instructions cause the computing system to:
   filter the cleared user records based on a subject matter of the command to be executed and the experience indicator in each of the cleared user records.

6. The computing system of claim 1 wherein the instructions cause the computing system to:
   identify a risk indicator indicative of a risk level corresponding to the command; and
   generate a risk output, based on the risk indicator, for surfacing to the assigned cleared user.

7. The computing system of claim 1 wherein the instructions cause the computing system to:
   detect an execution trigger and automatically execute the command based on the execution trigger.

8. The computing system of claim 7 wherein the instructions cause the computing system to:
   detect an authorization input indicative of the assigned cleared user authorizing execution of the command and to generate a trigger detected signal; and
   automatically execute the command on the target computing system in the computing environment based on the trigger detected signal.

9. The computing system of claim 1 wherein the request is received from a client computing system and wherein the instructions cause the computing system to:
   facilitate communication between the client computing system and the cleared user over a communication channel that is in the same particular compliance boundary as the target computing system.

10. The computing system of claim 9 wherein the request is received in a message on the communication channel and wherein the instructions cause the computing system to:
    automatically retrieve the command from the message on the communication channel and provide the command to the command execution logic for automatic execution.

11. The computing system of claim 10 wherein the instructions cause the computing system to:
    retrieve messages on the communication channel related to the request and to provide the messages to an archive data store.

12. A computer implemented method comprising:
    receiving, at a request processing system, a request to execute a command on a target computing system in a computing environment, the target computing system comprising a computing service within a particular compliance boundary;
    identifying a command clearance level that indicates a security credential, in the particular compliance boundary, adequate to execute the command on the target computing system in the computing environment;
    accessing a set of cleared user records, wherein each cleared user record corresponds to a cleared user, and includes a corresponding clearance level indicator indicating a user clearance level for the corresponding user;
    assigning a cleared user to the request based on a determination that the cleared user has a user clearance level, indicated by the clearance level indicator in the cleared user record corresponding to the cleared user, that meets the command clearance level adequate to execute the command on the target computing system; and
    sending the request to the assigned cleared user.

13. The computer implemented method of claim 12 wherein assigning the cleared user comprises:
    filtering the set of cleared user records, based in the corresponding clearance level indicator and the adequate command clearance level adequate to execute the command, to identify clearance level records that have a clearance level indicator that meets the adequate clearance level.

14. The computer implemented method of claim 13 wherein each of the cleared user records includes an availability indicator indicating an availability of the corresponding cleared user and wherein assigning the cleared user comprises:

identifying a timing corresponding to the request to execute the command; and filtering, the cleared user records based on the availability indicator and the identified timing corresponding to the request to execute the command.

15. The computer implemented method of claim 14 wherein each of the cleared user records includes an experience indicator indicating an experience of the corresponding cleared user and wherein assigning the cleared user comprises:

filtering the cleared user records based on a subject matter of the command to be executed and the experience indicator in each of the cleared user records.

16. The computer implemented method of claim 12 wherein sending the request to the assigned cleared user comprises:

identifying a risk indicator indicative of a risk level corresponding to the command; and generating a risk output, based on the risk indicator, for surfacing to the assigned cleared user.

17. A computing system, comprising:

at least one processor; and memory storing instructions executable by the at least one processor, wherein the instructions, when executed, provide:

a request processing system that receives a request, from a client computing system, to execute a command on a target computing system in a computing environment and identifies a command clearance level adequate to execute the command on the target computing system in the computing environment;

a cleared user pool accessing system that accesses a set of cleared user records, each cleared user record corresponding to a cleared user and having a corresponding clearance level indicator indicating a user clearance level for the corresponding user;

a cleared user assignment system that assigns a cleared user to the request based on a determination that the cleared user has a user clearance level, indicated by the clearance level indicator in the cleared user record corresponding to the cleared user, that meets the command clearance level adequate to execute the command on the target computing system;

command risk assessment logic configured to identify a risk indicator indicative of a risk level corresponding to the command;

risk surfacing logic configured to generate a risk output, based on the risk indicator, for surfacing to the assigned cleared user;

a cleared user interaction system that sends the request and the risk output to the assigned cleared user;

an automatic execution system configured to detect an execution trigger indicative of the assigned cleared user authorizing execution of the command and to automatically execute the command based on the execution trigger; and communication channel logic configured to facilitate communication between the client computing system and the assigned cleared user over a communication channel that is in a same compliance boundary as the target computing system.

\* \* \* \* \*